F. WILLSON & N. BOURQUIN.
EYE SHIELD SPECTACLES.
APPLICATION FILED NOV. 28, 1911.
1,021,175.
Patented Mar. 26, 1912.
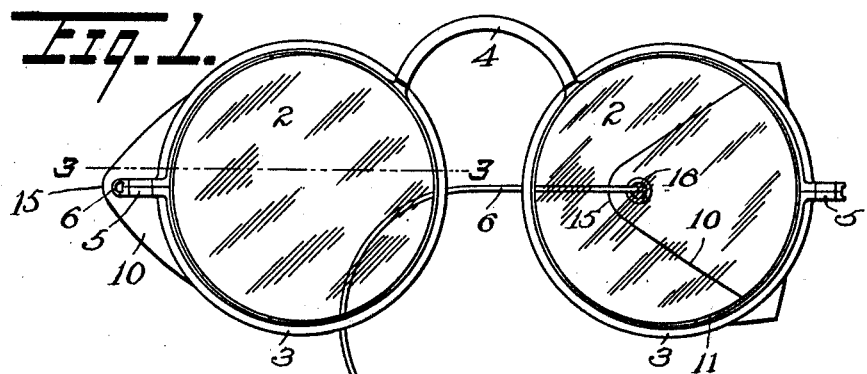
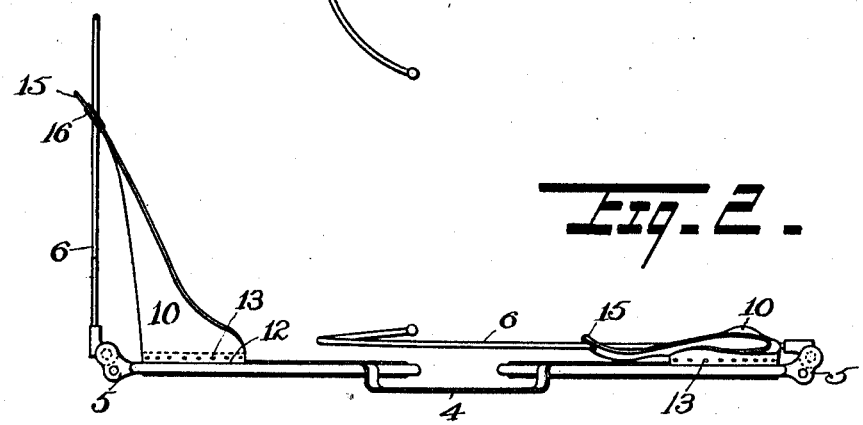
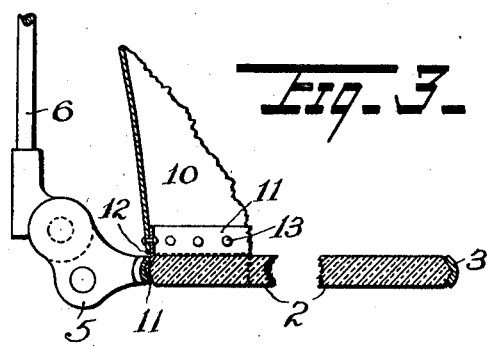
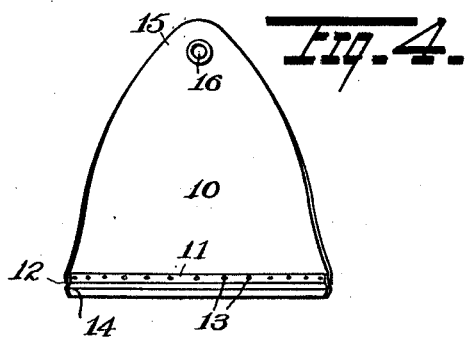

UNITED STATES PATENT OFFICE.

FREDERICK WILLSON AND NUMA BOURQUIN, OF READING, PENNSYLVANIA, ASSIGNORS TO T. A. WILLSON & CO., INCORPORATED, OF READING, PENNSYLVANIA, A CORPORATION OF PENNSYLVANIA.

EYE-SHIELD SPECTACLES.

1,021,175.      Specification of Letters Patent.      Patented Mar. 26, 1912.

Application filed November 28, 1911. Serial No. 662,897.

*To all whom it may concern:*

Be it known that we, FREDERICK WILLSON and NUMA BOURQUIN, both citizens of the United States, and residents of the city of Reading, in the county of Berks and State of Pennsylvania, have invented certain new and useful Improvements in Eye-Shield Spectacles, of which the following is a specification.

This invention relates to that class of spectacles in which special eye shields are provided in connection with the lenses to better adapt the same for automobile use or similar purposes; and it consists in applying such shields to spectacles having frames of ordinary construction, so as to provide a simple, neat and effective device as fully described in connection with the accompanying drawings; the novel features being specifically pointed out in the subjoined claims.

Figure 1 is a front view of spectacles embodying our invention, one of the shields being represented as in operative position and the other as folded against the lens with the temple. Fig. 2 is a plan view corresponding with Fig. 1. Fig. 3 is an enlarged sectional view on the line 3—3 of Fig. 1. Fig. 4 shows one of the eye shields complete, detached from its lens.

The lenses 2, 2 are larger than ordinary, but may be adapted to the eyes of the wearer as usual; and they are mounted in a frame of ordinary construction comprising the inclosing eye-wires 3, 3, a connection 4 corresponding with the usual nose piece, temple joints 5, 5 rigid with the eye-wires, and pivoted temples 6, 6; the eye-wires being of the usual grooved or V-shaped cross-section to engage the beveled edge of the lens. In our improved construction these eye-wires differ from the ordinary in being made slightly larger than is necessary to snugly inclose the lenses.

Each eye shield 10 is formed of a flexible material, such as leather or a suitable textile fabric, of approximately triangular shape, with a sheet-metal strip 11 attached to the straight edge 12 thereof, as shown, by a series of rivets 13 or other suitable means. This strip 11 is curved lengthwise to correspond with the periphery of the lens and is of greater width than the thickness of the latter; and it is formed with a lengthwise interior groove 14 adjacent one edge thereof which is adapted to engage the beveled rim of the lens. In assembling the parts one of these strips is inserted between each eye-wire 3 and the adjacent edge of the lens, at the outer side of the latter and extending somewhat less than half-way around the same as shown. The inwardly projecting corner portion 15 of each shield engages the adjoining temple 6 so as to cause the shield to be folded with the latter against the lens as indicated to the right of Fig. 1, or opened therewith as indicated to the left of said figure; such engagement being preferably effected by providing the shield with a corner perforation 16 through which the temple is loosely passed.

It will be understood that the shields 10, 10 are adapted to serve as effective side closures when opened, without unnecessarily detracting from the appearance of the wearer, and that when folded against the inner faces of the lenses there is no undue bulkiness; while at the same time the construction is simplified and cost economized by enabling the employment of the ordinary framing material and structure.

What we claim is:—

1. A pair of framed eye lenses having flexible eye-shields clamped between the frame-eyes and the outside edges of the respective lenses.

2. A pair of framed eye lenses having sheet-metal eye-shield strips clamped between the frame-eyes and the outside edges of the respective lenses, and eye-shields of flexible material attached to said strips.

3. Framed spectacles provided with flexible eye-shields of approximately triangular shape, each of said shields being clamped along one edge thereof between a frame-eye and the outside edge of a lens and having an inwardly extending corner portion engaging a temple wire.

In testimony whereof, we affix our signatures, in the presence of two witnesses.

FREDERICK WILLSON.
    NUMA BOURQUIN.

Witnesses:
    D. M. STEWART,
    W. G. STEWART.